United States Patent [19]
Schaffner et al.

[11] Patent Number: 5,751,867
[45] Date of Patent: May 12, 1998

[54] POLARIZATION-INSENSITIVE, ELECTRO-OPTIC MODULATOR

[75] Inventors: James H. Schaffner, Chatsworth; Daniel Yap, Thousand Oaks, both of Calif.

[73] Assignee: Hughes Aircraft Company, Los Angeles, Calif.

[21] Appl. No.: 591,997

[22] Filed: Jan. 26, 1996

[51] Int. Cl.$^6$ .................................................. G02B 6/10
[52] U.S. Cl. ........................ 385/3; 385/45; 385/132
[58] Field of Search ........................ 385/2, 3, 8, 9, 385/10, 45, 132

[56] References Cited

U.S. PATENT DOCUMENTS

| | | | |
|---|---|---|---|
| 4,932,738 | 6/1990 | Haas et al. | 350/96.14 |
| 4,936,644 | 6/1990 | Raskin et al. | 350/96.14 |
| 4,936,645 | 6/1990 | Yoon et al. | 350/96.14 |
| 5,278,923 | 1/1994 | Nazarathy et al. | 385/3 |

OTHER PUBLICATIONS

Thakara, J.I. et al., "Poled electro-optic waveguide formation", *Applied Physics Letters*, vol. 42, No. 13, Mar. 28, 1988, pp. 1031–1033.

Yap, D. et al., "Passive TiLiNbO$_3$ channel waveguide splitter", *Applied Physics Letters*, vol. 44, No. 6, Mar. 15, 1984, pp. 583–585.

Ishikawa, T., "Polarisation–independent LiNbO$_3$ Waveguide Optical Modulator", *Electronics Letters*, vol. 28, No. 6, Mar. 12, 1992, pp. 566–567.

Wang, W. et al., "Traveling wave electro-optic phase modulator using cross-linked nonlinear optical polymer", *Applied Physics Letters*, vol. 65, No. 8, Aug. 22, 1994, pp. 929–931.

Teng, C.C., "Traveling wave polymeric optical intensity modulator", *Applied Physics Letters*, vol. 60, No. 13, Mar. 30, 1992, pp. 1538–1540.

Gase, T., et al., "Polarization-independent phase modulator", *Optical Fiber Conference*, Sandiego, CA, Feb. 28–Mar. 3, 1995, OFC '94 Technical Digest, pp. 282–283.

Noltin, H.-P. et al. *"Integrated Optics"* Third European Conference, ECIO '85, Berlin, Germany, Springer Series Sciences, vol. 1–41, pp. 164–169.

*Primary Examiner*—John Ngo
*Attorney, Agent, or Firm*—V. D. Duraiswamy; W. K. Denson-Low

[57] ABSTRACT

An intensity modulator having a Mach-Zehnder structure with first and second waveguide arms formed of an electro-optic polymer. The active molecules of the waveguide arms are poled in first and second different and substantially orthogonal directions. Electrodes are arranged to receive a modulating voltage and generate first and second electric fields which are respectively aligned with the first and second directions. As a consequence, the modulation depth of an optical signal which is transmitted through the modulator is substantially insensitive to the polarization of the signal. Other embodiments combine mode splitters and combiners with first and second Mach-Zehnder modulators which have electro-optic polymer waveguides. The active molecules of the arms of the two Mach-Zehnder modulators are poled in orthogonal directions.

19 Claims, 3 Drawing Sheets

POLARIZATION-INSENSITIVE, ELECTRO-OPTIC MODULATOR

GOVERNMENT RIGHTS

The government has certain rights in this invention in accordance with MDA 972-94-3-0016 awarded by the Advanced Research Projects Agency (ARPA).

BACKGROUND OF THE INVENTION

1. Field of the Invention

The present invention relates generally to optical modulators and more particularly to electro-optic modulators.

2. Description of the Related Art

Optical intensity modulators are used in high-speed, fiber-optic links for a variety of applications, e.g., antenna remoting, cable television and communication systems. Although electro-absorption modulators can be used in some modulation applications, electro-optic modulators are generally preferred because of their superior signal fidelity. Electro-optic modulators utilize the linear electro-optic effect; this effect, which occurs in materials such as crystals, e.g., lithium niobate (LiNbO$_3$), and semiconductors, e.g., gallium arsenide, is a proportional change in refractive index N$_o$ to an applied electric field E.

The refractive index N$_o$ of a material is defined as $c/c_o$ in which c and $c_o$ are the speeds of light respectively in free space and in the material. Therefore, the time for light to travel a distance L in the material is $L/c = N_o L/c_o$ so that the time is proportional to N$_o$L which is known as the "optical path length". Therefore, phase modulation of an optical signal passing through an electro-optic waveguide of length L is proportional to an applied electric field because the optical path length N$_o$L is proportional to the electric field.

One conventional electro-optic modulator is the Mach-Zehnder modulator in which an optical signal at an input port is split into two signal components which travel down first and second waveguide arms before being recombined at an output port. At least one of the arms is an electro-optic waveguide. Phase modulation in this arm is converted to intensity modulation in the modulator by constructive and destructive interference when the signal components are recombined.

In crystals, the magnitude of the linear electro-optic coefficient r is a function of the crystal axes. For example, in LiNbO$_3$ the largest coefficient $r_{33}$ occurs along the crystalline z-axis. For the highest modulation sensitivity, the electric and optical fields must both be aligned along the z-axis. If the optical field is misaligned, only the signal vector component along the z-axis will be modulated with the sensitivity of the $r_{33}$ coefficient and other vector components will be modulated with a different sensitivity.

Thus, the modulation sensitivity is a function of the alignment between the electric and optical signals and the crystal, i.e., it is a function of the vector overlap (dot product) of the optical and electrical fields. For this reason, Mach Zehnder modulators are typically used with optical signals which have a single, linearly polarized mode whose polarization (the direction of the electric field) is properly aligned with the modulator's crystal. The modulation sensitivity for other signals, e.g., an elliptically polarized mode or a multimode signal, is unpredictable.

Although laser-generated signals are highly polarized and single-mode (SM) optical fibers conduct linearly-polarized signals with great fidelity, the orientation of the polarization is randomly rotated after a few meters due to various effects in SM fibers, e.g., fiber asymmetries and inhomogeneities. Accordingly, intensity modulators are often coupled to lasers with polarization-maintaining (PM) fibers to insure that a linearly polarized signal is presented for modulation with its polarization properly aligned. Although this arrangement is technically acceptable, the current cost of PM fibers (~$5 to $7 per meter) becomes excessive when modulators and signal sources are widely spaced. For example, in many CATV applications a single laser feeds several modulators which are located at distances from the laser of several kilometers. The cost of such systems would be dramatically reduced if PM fibers could be replaced with SM fibers because the current cost of SM fibers (~$0.15 to $0.22 per meter) is considerably less than that of PM fibers.

Primarily for this reason, several structures have been proposed to permit coupling of lasers and modulators with SM fibers. In one of these structures, metal members are positioned about the input port of the modulator so that they absorb undesired polarization components. Unfortunately, this structure absorbs a considerable portion, e.g., >50%, of the optical signal. Polarizing beam splitters are available which accept an unknown polarization and convert it to two known polarizations which can then be coupled to the two arms of a Mach Zehnder modulator. However, this structure involves additional parts cost (the beam splitter) and assembly cost (connection of additional fibers).

An x-cut LiNbO$_3$ crystal in which the electric field is oriented along the y-axis and the optical field propagates along the z-axis has been shown (see Ishikawa, T., "Polarisation-independent LiNbO3 Waveguide Optical Modulator", Electronics Letters, Vol. 28, No. 6, Mar. 12, 1992, pp. 566–567) to have substantially the same electro-optic coefficient r in orthogonal planes along the z-axis. Therefore, orthogonal vector components of the optical signal's polarization are modulated with the same sensitivity. However, the electro-optic coefficient is a fraction (e.g., ~1/10) of the coefficient of conventional modulators so that the modulating voltage must be increased accordingly (e.g., by a factor of ~10) which increases the complexity of the modulation-voltage generator.

SUMMARY OF THE INVENTION

The present invention is directed to polarization-insensitive, electro-optic modulators which are simple, do not require additional parts for operation and have sensitivities which are comparable to present electro-optic crystal modulators.

These goals are achieved with a recognition that the active molecules of first and second regions of a single electro-optic polymer member can be aligned respectively along first and second different directions and a recognition that the arms of a Mach-Zehnder modulator structure can be formed with electro-optic polymer waveguide arms that respectively contain these first and second regions. Finally, it is recognized that a polarization-insensitive modulator can be completed by generating first and second electric fields across the first and second waveguide arms and aligning these fields respectively with the first and second directions.

In one embodiment, the first and second directions are preferably orthogonal so that a first vector component of an input optical signal which aligns with the first direction is phase modulated in the first waveguide arm and not in the second waveguide arm. Similarly, a second vector component of the input optical signal which aligns with the second direction is phase modulated in the second waveguide arm and not in the first waveguide arm. By configuring the modulator structure so that phase modulation through the first arm equals that through the second arm, the intensity modulation of the modulator is caused to be substantially insensitive to the optical signal's polarization.

Another embodiment positions first and second Mach-Zehnder modulator structures between an input mode splitter and an output mode combiner. The active molecules of the waveguide arms of the first Mach-Zehnder modulator are aligned in a first direction and the active molecules of the waveguide arms of the second Mach-Zehnder modulator are aligned in a second and preferably orthogonal direction. Electrodes are arranged to generate first and second electric fields which are aligned respectively with the first and second directions and positioned across the waveguide arms respectively of the first and second Mach-Zehnder modulators. The modulators are configured with substantially equal "switching voltages" $V_\pi$ in the planes of their electric fields. The mode splitters and combiners guide different vector components of an input optical signal through the different Mach-Zehnder modulators.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
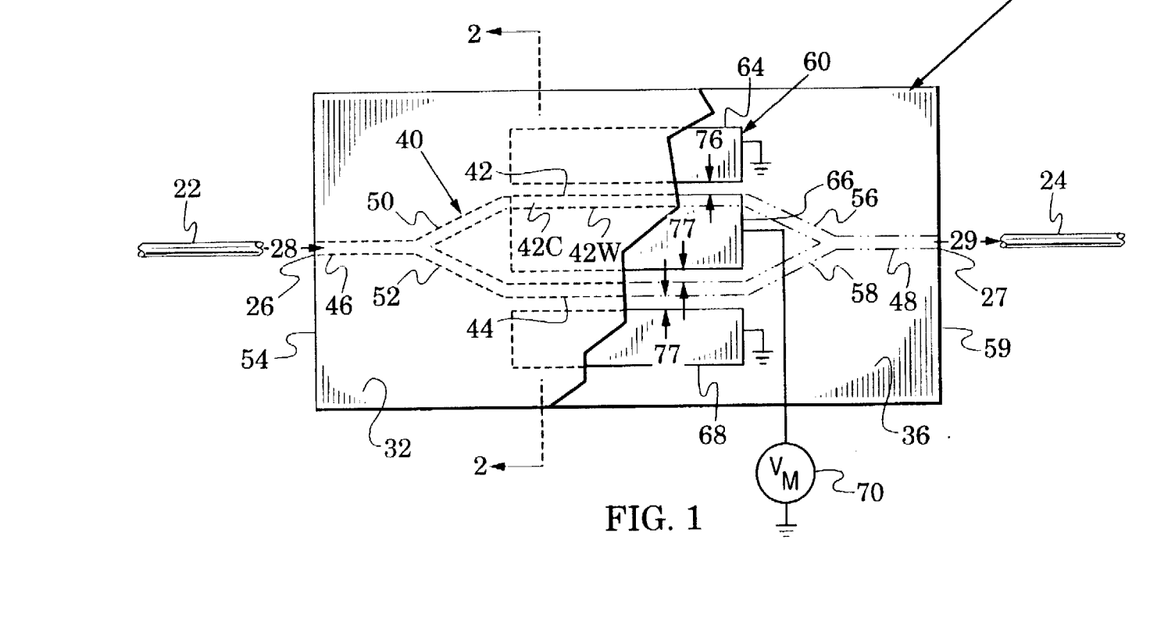
FIG. 1 is a plan view of a polarization-insensitive, electro-optic modulator embodiment in accordance with the present invention.
Figure 2:
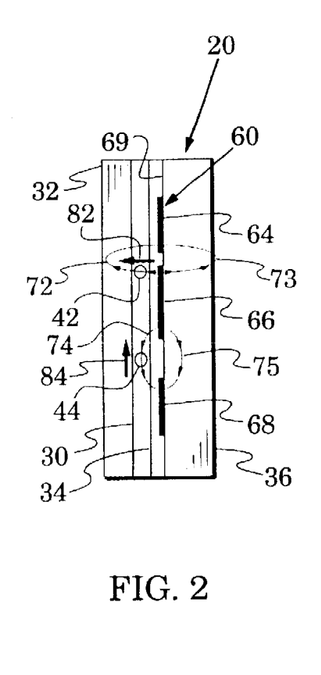
FIG. 2 is a view along the plane 2—2 of FIG. 1.

FIGS. 1 and 2 illustrate an optical intensity modulator 20. The figures also show SM fibers 22 and 24 which are respectively coupled to an input port 26 and an output port 27 of the modulator 20. The modulator embodiment 20 is configured to accept an optical signal 28 at its input port 26 and deliver an optical signal 29 at its output port 27 which is modulated with a sensitivity that is a function of a predetermined electro-optic coefficient r. In particular, the modulation sensitivity is insensitive to the polarization of the input signal 28.

In structural detail, FIG. 2 shows that the modulator 20 has an electro-optic polymer member arranged as a layer 30 and positioned between an upper polymer cladding layer 32 and a lower polymer cladding layer 34. These polymer layers are supported by a substrate 36.

An optical waveguide system 40 (see FIG. 1) is formed by any conventional process, e.g., selective photobleaching with ultraviolet light or selective etching of the electro-optic layer 30, which defines optical waveguides. Typically, these waveguides have a channel-like core region having a core refractive index and a wall or cladding region having a wall refractive index which is less than the core refractive index. These waveguides control the passage of light along the core region by total internal reflection because of the differences in refractive indices of the core and wall regions.

The electro-optic polymer waveguides are arranged to form the system 40. In particular, they include a first waveguide arm 42, a second waveguide arm 44, an input waveguide 46 and an output waveguide 48. Ends 50 and 52 of the waveguide arms 42 and 44 are coupled to an outer face 54 of the modulator 20 by the input waveguide 46. The end of the input waveguide 46 which adjoins the face 52 forms the input port 26. In a similar manner, ends 56 and 58 of the waveguide arms 42 and 44 are coupled to an outer face 59 of the modulator 20 by the output waveguide 48. The end of the output waveguide 48 which adjoins the face 59 forms the output port 27. The waveguide arm 42, the waveguide arm 44, the input waveguide 46 and the output waveguide 48 are arranged in the structural form of a conventional Mach-Zehnder modulator.

An electric field generation system 60 has metallic electrodes 64, 66 and 68 which are deposited on an upper surface 69 of the substrate 36 and which, therefore, have the coplanar relationship of FIG. 2. The system 60 is energized by a voltage generator 70 having a modulating voltage of $V_m$. The generator 70 can be connected across the electrodes 66 and 64 and across the electrodes 66 and 68 with conventional interconnects (e.g., deposited metallic lines on the substrate's upper surface 69) which are indicated schematically in FIG. 1 with lines and ground symbols. For clarity of illustration, portions of the upper cladding layer 32, the electro-optic polymer layer 30 and the lower cladding layer 34 are removed in FIG. 1 to better illustrate the electrodes 64, 66 and 68. The positions of members of the waveguide system 40 in the removed portions are indicated by phantom lines.

The electrodes 64 and 66 are positioned so that when the modulating voltage $V_m$ is impressed upon them, they generate an electric field across the first waveguide arm 42 as indicated by an exemplary electric field line 72 through the waveguide arm 42. To indicate the symmetry of the electric field, a corresponding electric field line 73 is shown on the opposite side of the electrodes 64 and 66. The electrodes 66 and 68 are positioned so that when the modulating voltage $V_m$ is impressed upon them, they generate an electric field across the second waveguide arm 44 as indicated by an exemplary electric field line 74 through the waveguide arm 44. Again, the symmetry of the electric field is indicated by a corresponding electric field line 75 on the opposite side of the electrodes 66 and 68.

In particular, an upper edge of the electrode 66 is positioned underneath the waveguide arm 42 and the electrode 64 is spaced away from the upper edge of the waveguide arm 42 by a space 76. A lower edge of the electrode 66 and an upper edge of the electrode 68 are each spaced away from the waveguide arm 44 by a space 77.

Subsequent to the definition of the waveguide system 40, portions of the waveguide arms 42 and 44 are poled, i.e., exposed to a strong electric field, to at least partially align their active molecules along a selected plane through each arm. In particular, the active molecules of the first electro-optic waveguide 42 are at least partially aligned along a plane which is substantially parallel to the electric field line 72 as it passes through the first electro-optic waveguide 42 in FIG. 2, i.e., parallel to a direction arrow 82 and orthogonal to the upper substrate surface 69. Also, the active molecules of the second electro-optic waveguide 44 are at least partially aligned along a plane which is substantially parallel to the electric field line 74 as it passes through the second electro-optic waveguide 44 in FIG. 2, i.e., parallel to a direction arrow 84 which is orthogonal to the direction arrow 82.

Because of these active molecule alignments, the waveguide arm 42 has an electro-optic coefficient $r_1$ along a plane through the arm 42 which is parallel with the direction arrow 82 and much smaller (by at least an order of magnitude) electro-optic coefficients along other planes through the arm 42. Also because of the molecule alignments, the waveguide arm 44 has an electro-optic coefficient $r_2$ along a plane through the arm 44 which is parallel with the direction arrow 84 and much smaller (by at least an order of magnitude) electro-optic coefficients along other planes through the arm 44. The poling of the arms 42 and 44 is preferably adjusted so that $r_1=r_2=r$ in which r is a predetermined electro-optic coefficient. In a feature of the invention, therefore, the polymer waveguide arms 42 and 44 are configured with substantially equal electro-optic coefficients along orthogonal planes.

In operation of the intensity modulator 20, an optical signal 28 is coupled to the input port 26 by the SM fiber 22. The signal 22 is split into two substantially equal signal portions. One portion is coupled to the waveguide arm 42 through its end 50 and the other portion is coupled to the waveguide arm 44 through its end 52. After passing through the waveguide arms 42 and 44, the signal portions are coupled through respective ends 56 and 58 to the output waveguide where they combine to form a modulated signal 29.

Figure 3:
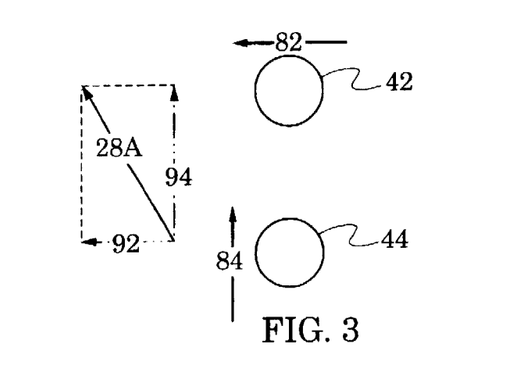
FIG. 3 is a diagram which compares an unpredictable, input optical signal polarization with its vector components along orthogonal planes of modulating electric fields and electro-optic coefficients in waveguide arms of the modulator of FIGS. 1 and 2.

The polarization of the input optical signal 28 is represented in FIG. 3 by an arrow 28A. Although the orientation of this polarization 28A is unpredictable, it will have vector components 92 and 94 which are respectively parallel with the orthogonal direction arrows 82 and 84. The vector component 92 will be phase modulated in the waveguide arm 42 because (as exemplified by the direction arrow 82) it aligns with the plane of the arm 42 which has an electro-optic coefficient r and also aligns with the modulating electric field in the arm 42. Because the vector component 92 is orthogonal with the electro-optic plane and electric field of the waveguide arm 44, it will be substantially unmodulated in this arm.

In a similar process, vector component 94 will be phase modulated in the waveguide arm 44 because (as exemplified by the direction arrow 84) it aligns with the plane of the arm 44 which has an electro-optic coefficient r and also aligns with the modulating electric field in the arm 44. Because the vector component 94 is orthogonal with the electro-optic plane and electric field of the waveguide arm 42, it will be substantially unmodulated in this arm.

In FIG. 1 therefore, relative to the vector component 92, a phase modulated signal at the end 56 of the waveguide arm 42 will combine with an unmodulated signal at the end 58 of the waveguide arm 44 and form a first intensity modulated signal. Relative to the vector component 94, an unmodulated signal at the end 56 of the waveguide 42 will combine with a phase modulated signal at the end 58 of the waveguide arm 44 and form a second intensity modulated signal. The first and second intensity modulated signals combine as an output signal 29 which has been intensity modulated in accordance with a electro-optic coefficient r. In a feature of the invention, this operation will occur regardless of the orientation of the polarization 28A, i.e., the intensity modulator 20 is polarization insensitive.

Mathematically, the unpredictable polarization 28A of the optical field of the signal 28 will have an overlap $\eta_1$ (dot product) with the electric field (along the direction 82) in the waveguide arm 42 and an overlap $\eta_2$ with the electric field (along the direction 84) in the waveguide arm 44. Because $\eta_1+\eta_1=1$, the input signal 28 will be phase modulated in accordance with the equation of $$\Delta\phi = \pi N^3 rE\left(\frac{L}{\lambda}\right) \qquad (1)$$

as long as the waveguide arms 42 and 44 have (parallel with respective direction arrows 82 and 84) the same refractive index N, the same electro-optic coefficient r, the same electric field strength E and the same length L of poled electro-optic material ($\lambda$ is the optical signal wavelength).

The equality of electric field E is achieved by an appropriate spatial arrangement between the electrodes 64, 66 and 68 and the arms 42 and 44 which includes a selection of the spaces 76 and 77. The same length L of electro-optic waveguide is achieved by an appropriate control of the poling process.

When $\Delta\phi=\pi$, the recombination interference in the output waveguide 48 will cause a complete cutoff of the output signal 29. The electric field required to switch the modulator 20 from full on to full off is given by $$E_\pi = \left\{ 2N_0^3 r \left(\frac{L}{\lambda}\right) \right\}^{-1}.$$

This electric field $E_\pi$ will be produced by a switching voltage $V_\pi$ which is the voltage at the generator 70 required to switch the output signal 29 from full on to full off. The value of $V_\pi$ is dependent upon the selected spatial arrangement between the electrodes 64, 66 and 68 and the arms 42 and 44 (including the selected magnitudes of the spaces 76 and 77).

Having described the operation of one modulator embodiment, it is noted that equation (1) shows that the modulator 20 will be polarization insensitive as long as $\Delta\phi$ is the same in the waveguide arms 42 and 44 along their respective direction arrows 82 and 84 (alternatively, as long as the switching voltage $V_\pi$ is the same in the waveguide arms 42 and 44).

Therefore, other embodiments of the modulator 20 may have different parameter values for the waveguide arms 42 and 44, e.g., different electro-optic coefficients $r_1$ and $r_2$, different electric fields E across the waveguide arms 42 and 44 and different lengths L of poled active molecules. It is only necessary that these parameters be selected so that the $\Delta\phi$ of equation (1) is substantially equal in the waveguide arms 42 and 44 along their respective direction arrows 82 and 84 (equivalently, the same switching voltage $V_\pi$ along the direction arrows 82 and 84). For example, $r_1$ could be greater than $r_2$ as long as the electric field E in the waveguide arm 44 were increased accordingly. In modulator embodiments of the invention, the planes of electric fields and electro-optic coefficients of the waveguide arms 42 and 44 are preferably orthogonal.

Figure 4:
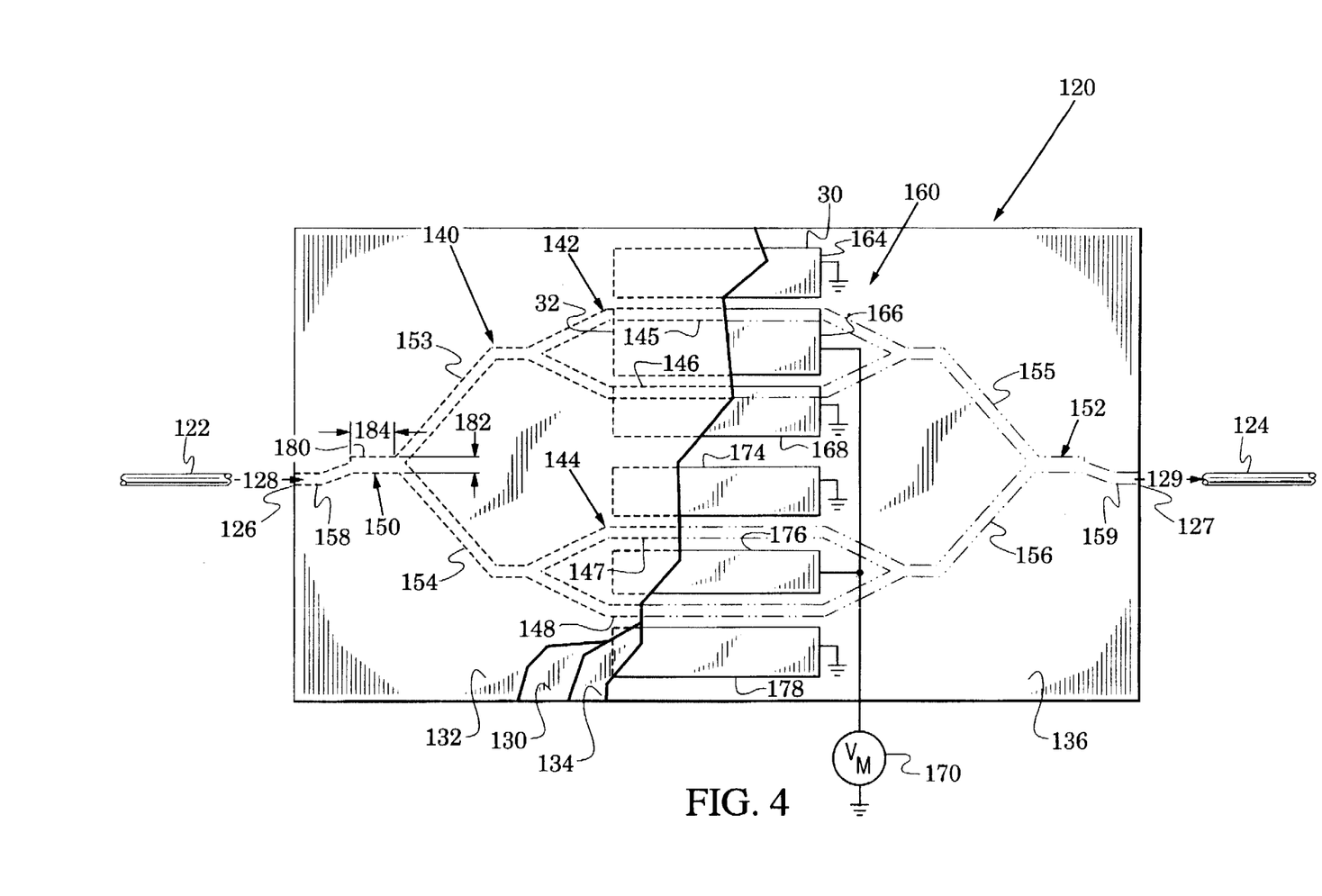
FIG. 4 is a plan view of another polarization-insensitive electro-optic modulator embodiment.

Another modulator embodiment 120 is shown in FIG. 4. SM fibers 122 and 124 can be respectively coupled to an input port 126 and an output port 127 of the modulator 120. The modulator embodiment 120 is configured to accept an optical signal 128 at its input port 126 and deliver an intensity modulated optical signal 129 at its output port 127 whose modulation depth is insensitive to the polarization orientation at the input port 126.

The modulator 120 has a layered structure which is similar to that of the modulator 20. An electro-optic polymer layer 130 is positioned between an upper polymer cladding layer 132 and a lower polymer cladding layer 134. These polymer layers are supported by a substrate 136.

The modulator 120 has an optical waveguide system 140 which is formed with processes similar to those of the modulator 20. However, the waveguide system 140 includes an upper Mach-Zehnder intensity modulator structure 142 and a lower Mach-Zehnder intensity modulator structure 144. The upper modulator structure 142 has arms 145 and 146 which are both poled to have an electro-optic coefficient r in a plane which is orthogonal to the substrate 136, i.e., a plane oriented similar to the direction arrow 82 of FIG. 2. In contrast, the lower modulator structure 144 has arms 147 and 148 which are both poled to have an electro-optic coefficient r in a plane which is parallel to the substrate 136, i.e., a plane oriented similar to the direction arrow 84 of FIG. 2.

The waveguide system 140 also includes a mode splitter 150 and a mode combiner 152. The upper modulator structure 142 and the lower modulator structure 144 are respectively coupled to the mode splitter 150 with waveguides 153 and 154. They are respectively coupled to the mode combiner 152 with waveguides 155 and 156. The mode splitter 150 includes a waveguide 158 which couples it to the input port 126 and the mode combiner 152 includes a waveguide 159 which couples it to the output port 127.

An electric-field generation system 160 has metallic electrodes 164, 166 and 168 which are positioned in a relationship with the waveguide arms 145 and 146 that is similar to the relationship between the electrodes 64 and 66 and the arm 42 of the modulator 20. That is, a relationship which generates an electric field in both arms 145 and 146 that is orthogonal to the substrate 136, i.e., a field oriented similar to the direction arrow 82 of FIG. 2.

The electric-field generation system 160 also has metallic electrodes 174, 176 and 178 which are positioned in a relationship with the waveguide arms 147 and 148 that is similar to the relationship between the electrodes 66 and 68 and the arm 44 of the modulator 20. That is, a relationship which generates an electric field in both arms 147 and 148 that is parallel to the substrate 136, i.e., a field oriented similar to the direction arrow 84 of FIG. 2. The system 160 is energized by a voltage generator 170 having a modulating voltage of $V_m$.

For clarity of illustration, portions of the upper cladding layer 132, the electro-optic polymer layer 130 and the lower cladding layer 134 are removed in FIG. 3 to better illustrate the electric-field generation system 160. The positions of members of the waveguide system 140 in the removed portions are indicated by phantom lines.

The mode splitter 150 is a conventional structure (e.g., see Yap, D. et al., "Passive TiLiNbO3 channel waveguide TE-TM mode splitter", *Applied Physics Letters*, Vol. 44, No. 6, Mar. 15, 1984, pp. 583–585) which includes a waveguide section 180 having a width 182 and a length 184. The width 182 is selected to support two propagation modes of the input signal 128. Preferably, these are the lowest two propagation modes of the input signal 128 which have symmetric and antisymmetric intensity distributions across the waveguide 180. For example, if the signal 128 has a fundamental $TE_{10}$ mode, the waveguide width 182 is selected to support the $TE_{10}$ and $TE_{20}$ modes. Because these modes propagate along the waveguide 180 with different propagation constants, their symmetric and antisymmetric intensity distributions across the waveguide 180 sometimes combine to concentrate the electromagnetic energy in the upper half of the waveguide 180 and sometimes in the lower half of the waveguide 180. This concentration is periodic as the energy moves along the length 184.

In addition, the difference in propagation constants has one value for a first vector component of the polarization of the input signal 128 which is parallel with the substrate 136 (i.e., oriented similar to the direction arrow 82 of FIG. 2) and a different value for a second vector component of the input signal 128 that is parallel to the substrate 136 (i.e., oriented similar to the direction arrow 84 of FIG. 2). Accordingly, it is possible to select the length 184 so that the first vector component is in the upper half of the waveguide 180 and the second vector component is in the lower half of the waveguide 180 for signal energies positioned at the end of the waveguide 180 that is coupled to the waveguides 153 and 154.

Thus, in operation of the modulator 120, the polarization of the signal energy that is coupled to the Mach-Zehnder modulator 142 will align with the plane of the electro-optic coefficient and the modulating electric field in both arms 145 and 146 (i.e., a plane oriented similar to the direction arrow 82 of FIG. 2). As a result, an intensity modulated signal is coupled into the waveguide 155. In a similar process, the polarization of the signal energy that is coupled to the Mach-Zehnder modulator 144 will align with the plane of the electro-optic coefficient and the modulating electric field in both arms 147 and 148 (i.e., a plane oriented similar to the direction arrow 84 of FIG. 2). As a result, an intensity modulated signal is coupled into the waveguide 157.

Because the mode combiner 152 is the structural complement of the mode splitter 150, the modulated signals of the waveguides 155 and 157 are combined into the output signal 129 which will have the same fundamental propagation mode as the input signal 128. In a feature of the invention, the modulation depth of this operation is insensitive to the orientation of the polarization of the input signal 128. It is only necessary that (similar to the modulator 20 of FIGS. 1 and 2) the structure and parameters (e.g., electro-optic coefficients, electric field strengths, and waveguide lengths of poled active molecules) of the Mach-Zehnder modulators 142 and 144 be selected to have substantially the same switching voltage $V_\pi$.

Although the modulator 120 of FIG. 3 is somewhat more complex than the modulator 20 of FIGS. 1 and 2, it has a higher modulation sensitivity because phase modulations of opposite sign are produced (a "push-pull" process) in the arms 145 and 146 of the modulator 142 (and in the arms 147 and 148 of the modulator 144). In contrast, phase modulation is only produced in one of the arms 42 and 44 in the modulator 20 for each polarization component.

Fabrication steps of the modulator 20 of FIGS. 1 and 2 (or the modulator 120 of FIG. 4) include the selection of an electro-optic polymer for the electro-optic layer 30. Such polymers typically contain electro-optic chromophores carried in physical association with polymer materials, e.g., polyimides or acrylates. Generally, the chromophores are mixed with the polymer or are attached to the polymer as side chains. Although the electro-optic coefficients of such polymers is typically lower than those of electro-optical crystals, the trend of recent polymer developments has been to decrease the difference.

The substrate 36 can be of various conventional insulating materials, e.g., silicon or quartz. The cladding layer 34 serves primarily to space the waveguide arms 42 and 44 sufficiently from the electrodes that electromagnetic energy is not excessively coupled out of the arms 42 and 44. The cladding layer 32 serves primarily to protect and seal the modulator. The material of the cladding layers can be of a variety of polymers such as polyimides or acrylates. The layers 30, 32 and 34 can be applied by conventional processes, e.g., spinning.

Figure 5:
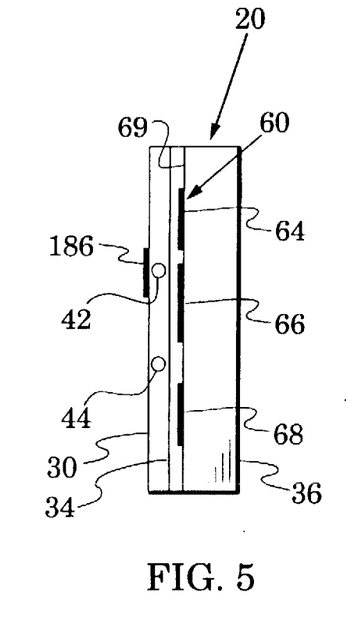
FIG. 5 is a view similar to FIG. 2 which illustrates an interim fabrication step of the modulator of FIGS. 1 and 2.

The electrodes 64, 66 and 68 can be deposited, e.g., by evaporation or sputtering, onto the substrate with various metals, e.g., aluminum, copper or gold. The electric-field generation system 60 can include a variety of electrode embodiments. For example, the electrodes 64, 66 and 68 of FIGS. 1 and 2 can be positioned on top of the upper cladding layer 32. In another embodiment, the temporary electrode 186 of FIG. 5 is substituted for the electrode 64 to apply (with the electrode 66) a modulating voltage to the waveguide arm 42.

In an exemplary photobleaching process for forming the waveguide system 40, a planar layer of electro-optic material is deposited. The layer is then exposed to ultraviolet light through a mask such that only the wall regions are exposed and thus bleached. The refractive index of the exposed wall material is reduced by the bleaching which produces higer refractive-index core regions and lower refractive-index wall regions.

In an exemplary etching process for forming the waveguide system 40, a planar layer of electro-optic material is masked and selectively etched away such that only the core regions remain. A second layer of cladding material which has a lower refractive index than the core is deposited to fill the the etching voids. This second layer can be (but need not be) of the same material as the upper cladding layer, e.g., the layer 32 in FIG. 2.

In FIG. 1, the wall region of each waveguide is indicated by the waveguide edges, e.g., the broken lines 42W of the waveguide arm 42, and the core region is the area within the waveguide edges, e.g., the area 42C within the broken lines 42W of the waveguide arm 42.

Thus, although both the core and wall regions of the waveguide system 40 may be comprised of electro-optic polymers, modulator embodiments can be formed with only the core regions formed of an electro-optic polymer. Modulator embodiments may also form the ends 50, 52, 56 and 58 of the waveguide arms 42 and 44 and the input and output waveguides 46 from conventional polymers rather than electro-optic polymers.

The poling voltage for setting the orientation and strength of the electro-optic coefficients of the waveguide arms 42 and 44 may conveniently be performed prior to deposition of the cladding layer 32. In the case of the waveguide arm 44, the poling field may be established by a voltage across the electrodes 66 and 68. In the case of the waveguide arm 42, the poling field may be established by a voltage across the electrode 62 and a temporary electrode 186 which is deposited over the electro-optic polymer layer 30 as shown in FIG. 5. After the poling of the waveguide arms 42 and 44 has been completed, the temporary electrode 174 can be removed and the cladding layer 32 of FIGS. 1 and 2 applied.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A polarization-insensitive modulator for intensity modulation of an optical signal with a modulating voltage, comprising:

a first electro-optic polymer waveguide having active molecules that are at least partially ordered in a first direction, said first electro-optic polymer waveguide having input and output ends;

a second electro-optic polymer waveguide having active molecules that are at least partially ordered in a second direction which is different from said first direction, said first electro-optic polymer waveguide having input and output ends;

said input ends of said first and second electro-optic polymer waveguides coupled together to form an input port;

said output ends of said first and second electro-optic polymer waveguides coupled together to form an output port; and an electric-field generation system which includes first, second and third coplanar electrodes, said first and second coplanar electrodes arranged to receive said modulating voltage and generate a first electric field across said first electro-optic polymer waveguide which is substantially parallel with said first direction and said second and third coplanar electrodes arranged to receive said modulating voltage and generate a second electric field across said second electro-optic polymer waveguide which is substantially parallel with said second direction;

said optical signal modulated by said modulating voltage when said modulating voltage is applied to said electric-field generation system and said optical signal is received into said input port and transmitted to said output port.

2. The polarization-insensitive modulator of claim 1 wherein said first and second directions are substantially orthogonal.

3. The polarization-insensitive modulator of claim 1 wherein said first and second electro-optic polymer waveguides each include;

an electro-optic polymer core having a core refractive index; and a polymer wall adjoining said core and having a wall refractive index which is less than said core refractive index.

4. The polarization-insensitive modulator of claim 3 wherein said electro-optic polymer core includes a plurality of electro-optic chromophores carried in physical association with a polymer.

5. The polarization-insensitive modulator of claim 1 further including an electro-optic polymer member which is configured to include said first electro-optic polymer waveguide and said second electro-optic polymer waveguide.

6. The polarization-insensitive modulator of claim 1 wherein said second electrode is positioned adjacent to said first electro-optic polymer waveguide, said first electrode is spaced from said second electrode and said second and third electrodes are each spaced from said second electro-optic polymer waveguide.

7. A polarization-insensitive modulator for intensity modulation of an optical signal with a modulating voltage, comprising:

a Mach-Zehnder intensity modulator having an input port, an output port and first and second arms coupled between said input and output ports, said first arm including a first electro-optic polymer waveguide having active molecules which are at least partially ordered in a first direction and said second arm including a second electro-optic polymer waveguide having active molecules which are at least partially ordered in a second direction which is different from said first direction; and an electric-field generation system which includes first, second and third coplanar electrodes, said first and second coplanar electrodes arranged to receive said modulating voltage and generate a first electric field across said first electro-optic polymer waveguide which is substantially parallel with said first direction and said second and third coplanar electrodes arranged to receive said modulating voltage and generate a second electric field across said second electro-optic polymer waveguide which is substantially parallel with said second direction;

said optical signal modulated by said modulating voltage when said modulating voltage is applied to said electric-field generation system and said optical signal is received into said input port and transmitted to said output port.

8. The polarization-insensitive modulator of claim 7 wherein said first and second directions are substantially orthogonal.

9. The polarization-insensitive modulator of claim 7 wherein said first and second electro-optic polymer waveguides each include;

an electro-optic polymer core having a core refractive index; and a polymer wall adjoining said core and having a wall refractive index which is less than said core refractive index.

10. The polarization-insensitive modulator of claim 9 wherein said electro-optic polymer core includes a plurality of electro-optic chromophores carried in physical association with a polymer.

11. The polarization-insensitive modulator of claim 7 further including an electro-optic polymer member which is configured to include said first electro-optic polymer waveguide and said second electro-optic polymer waveguide.

12. The polarization-insensitive modulator of claim 7 wherein said second electrode is positioned adjacent to said first electro-optic polymer waveguide, said first electrode is spaced from said second electrode and said second and third electrodes are each spaced from said second electro-optic polymer waveguide.

13. A polarization-insensitive modulator for intensity modulation of an optical signal with a modulating voltage, comprising:

a first Mach-Zehnder intensity modulator having an input port, an output port and first and second electro-optic polymer waveguide arms coupled between said input and output ports, each of said arms having active molecules which are at least partially ordered in a first direction;

a second Mach-Zehnder intensity modulator having an input port, an output port and first and second electro-optic polymer waveguide arms coupled between said input and output ports, each of said arms having active molecules which are at least partially ordered in a second direction which is different from said first direction;

a mode splitter configured to receive said optical signal and generate first and second optical signals having polarizations substantially parallel respectively with said first and second directions, said mode splitter arranged to couple said first optical signal to said input port of said first Mach-Zehnder intensity modulator and to couple said second optical signal to said input port of said second Mach-Zehnder intensity modulator;

a mode combiner configured to receive first and second modulated optical signals with polarizations substantially parallel respectively with said first and second directions from the output ports of said first and second Mach-Zehnder modulators and further configured to generate a modulated output signal which is the vector sum of said first and second modulated optical signals; and an electric-field generation system arranged to receive said modulating voltage and generate a first electric field across said first and second electro-optic polymer waveguides of said first Mach-Zehnder intensity modulator which is substantially parallel with said first direction and generate a second electric field across said first and second electro-optic polymer waveguides of said second Mach-Zehnder intensity modulator which is substantially parallel with said second direction;

said optical signal modulated by said modulating voltage when said modulating voltage is applied to said electric-field generation system and said optical signal is received by said mode splitter and transmitted to said mode combiner.

14. The polarization-insensitive modulator of claim 13 wherein said first and second directions are substantially orthogonal.

15. The polarization-insensitive modulator of claim 13 wherein the first and second polymer, optical waveguides of said first and second Mach-Zehnder intensity modulators each include;

an electro-optic polymer core having a core refractive index; and a polymer wall adjoining said core and having a wall refractive index which is less than said core refractive index.

16. The polarization-insensitive modulator of claim 15 wherein said electro-optic polymer core includes a plurality of electro-optic chromophores carried in physical association with a polymer.

17. The polarization-insensitive modulator of claim 13 wherein said mode splitter includes:

a waveguide having an input for reception of said optical signal and first and second outputs, said waveguide configured to receive a fundamental electromagnetic mode at said input and to generate, in response, symmetric and antisymmetric electromagnetic modes which combine to periodically concentrate different polarization energies in different portions of said waveguide, said waveguide having a length selected to guide different ones of said polarization energies into different ones of said first and second outputs.

18. The polarization-insensitive modulator of claim 13 wherein said electric-field generation system includes first, second and third coplanar electrodes which are positioned to generate said first electric field when said modulating signal is connected across said first and second electrodes and across said second and third electrodes, said electric-field generation system also including fourth, fifth and sixth coplanar electrodes which are positioned to generate said second electric field when said modulating signal is connected across said fourth and fifth electrodes and across said fifth and sixth electrodes.

19. The polarization-insensitive modulator of claim 18 wherein:

said second electrode is positioned adjacent to said first electro-optic polymer waveguide of said first Mach-Zehnder intensity modulator, said first electrode is spaced from said second electrode and said second and third electrodes are each spaced from said second electro-optic polymer waveguide of said first Mach-Zehnder intensity modulator; and said fifth electrode is positioned adjacent to said first electro-optic polymer waveguide of said second Mach-Zehnder intensity modulator, said fourth electrode is spaced from said fifth electrode and said fifth and sixth electrodes are each spaced from said second electro-optic polymer waveguide of said first Mach-Zehnder intensity modulator.

* * * * *